Dec. 25, 1928.　　　　　　　　　　　　　　　　　　1,696,846
K. IMHOFF
SEWAGE TREATMENT WITH THE AID OF A SCREEN ACTING LIKE A FILTER
Filed June 18, 1927
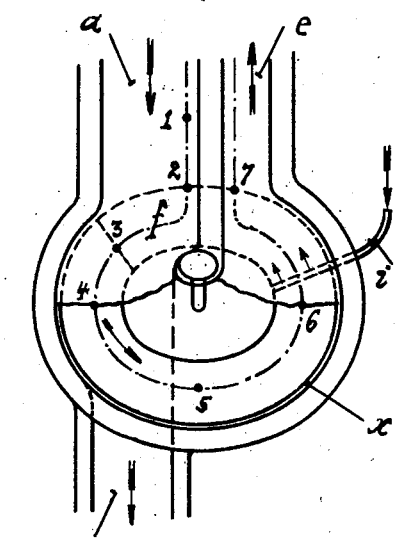
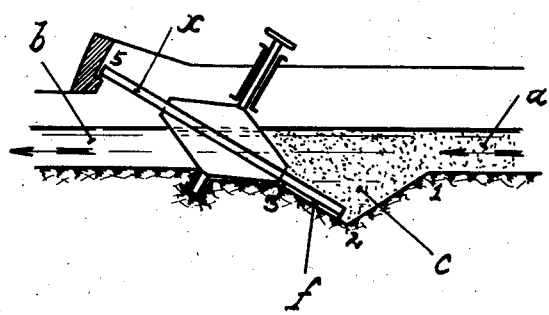
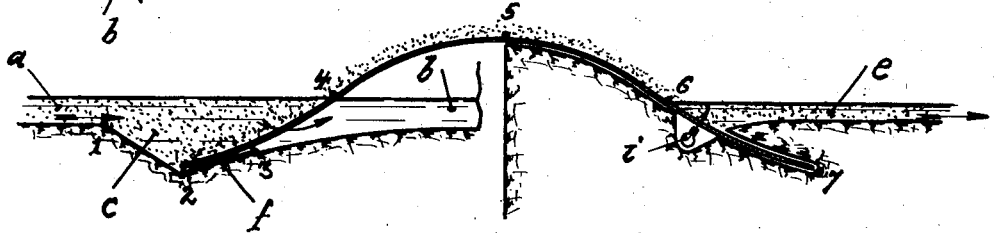
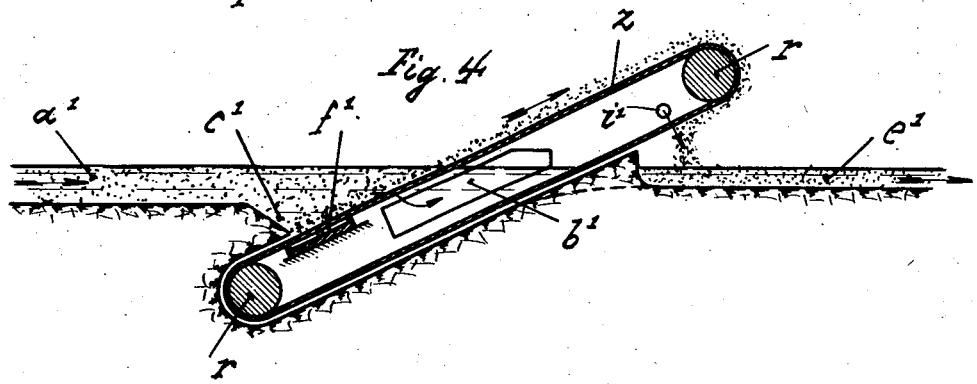

Patented Dec. 25, 1928.

1,696,846

UNITED STATES PATENT OFFICE.

KARL IMHOFF, OF ESSEN, GERMANY.

SEWAGE TREATMENT WITH THE AID OF A SCREEN ACTING LIKE A FILTER.

Application filed June 18, 1927, Serial No. 199,782, and in Germany July 31, 1926.

Sewage screens generally keep back only substances which are coarser than the interstices of the screen. By the gradual formation on the screen of a layer of coarse materials, which acts then like a filter, finer substances are then also retained by the screen. Heretofore, the formation of such a filter of finer matter on the screen was quite accidental, and the object of the present invention is to provide means for positively causing such formation.

For this purpose, coarse material, for instance little peat, can be added to the sewage, to settle upon the interstices of the screen and thereby quickly form the desired filter thereon.

Another way of attaining the desired end consists in first exposing the screen for some time in a sewage tank in such a manner that the sewage can not pass through the screen and thus enable a layer of sludge to settle thereon. Afterwards sewage is permitted to pass through the screen which then acts like a filter by reason of the presence of said layer.

The accompanying drawing illustrates diagrammatically by way of example how the invention can be put into practice:

Figs. 1 and 2 are respectively a plan view and a side view of an obliquely mounted rotary screen in a sewage basin, while Fig. 3 shows a developed projection of its rotary movement; and Fig. 4 is a side view of an endless screen moving in a sewage tank.

Referring to Figs. 1 to 3:—

The sewage arriving at $a$ (Figure 2) is first delivered to a settling basin $c$ having sloping sides shown at 1, 2, 3. The lower part $f$ of the inclined rotary screen $x$ revolves over the side of the basin $c$ which lies between the points 2 and 3, and this side may have parts engaging the lower face of the screen so that no sewage can pass through it but instead a thin layer of sludge settles thereon. During the further rotation of the screen from point 3 to point 4, its part $f$ is raised beyond the bottom of the basin $c$ and thus allows the passage of the sewage through the thin sludge layer on the screen into the out-flow channel $b$ for the strained sewage. Then, the part $f$ with the sludge and the layer further deposited on the part $f$ during its passage from point 3 to 4, is raised above the water level through points 4, 5, and 6. At 6 it again enters the sewage but this time on the side of the sludge out-flow channel $e$. There directly behind the point 6, a rinsing-water pipe $i$ is located below the screen, for the purpose of diluting the sludge layer thereon by rinsing-water from below, so that it can escape through the sludge out-flow channel $e$. The screen thus cleaned rotates further beyond the point 7 in said channel until it arrives again at point 2 in the sewage supply channel $a$ where the same proceeding is repeated.

Referring to Fig. 4:—The rotary screen is here replaced by an endless ribbonlike screen $z$ continuously moved over roller-guides $r$. The sewage arriving at $a^1$ is first supplied to a basin $c^1$, the part $f^1$ of the screen adjacent to the inclined bottom of said basin being engaged from below the same as before and the sewage strained flowing off through $b^1$, while the sludge layer on the strainer is rinsed-off from below at $i^1$ directly above the sludge out-flow channel $e^1$.

Instead of by rinsing-water, of course, the sludge layer can also be again removed by brushing it off, or in any other suitable way.

What I claim, is:—

1. In sewage treatment, the process of exposing a screen to the sewage, and preventing passage of sewage therethrough till a filter of sludge forms thereon, then causing the passage of sewage therethrough to take place, and finally removing the sludge from the screen.

2. In combination, an obliquely mounted continuously moving sewage screen having part thereof covered below and exposed above to the sewage to prevent passage of sewage therethrough, and enable a filter of sludge to form on said covered part of the screen, and means for removing said filter after sewage has been allowed to flow through same.

3. Apparatus for treating sewage comprising a movable screen mounted to have its successive portions covered on one side and exposed on the opposite side to sewage at a definite point in the movement or travel of said portions, so that said portions are one after the other provided with a layer of sludge to form a filter thereon, and means for removing said filter after sewage has been allowed to flow through same.

In testimony whereof I have hereunto set my hand.

KARL IMHOFF.